C. A. WRIGHT.
APPLIQUÉ MACHINE.
APPLICATION FILED APR. 24, 1913.
1,085,518.
Patented Jan. 27, 1914.
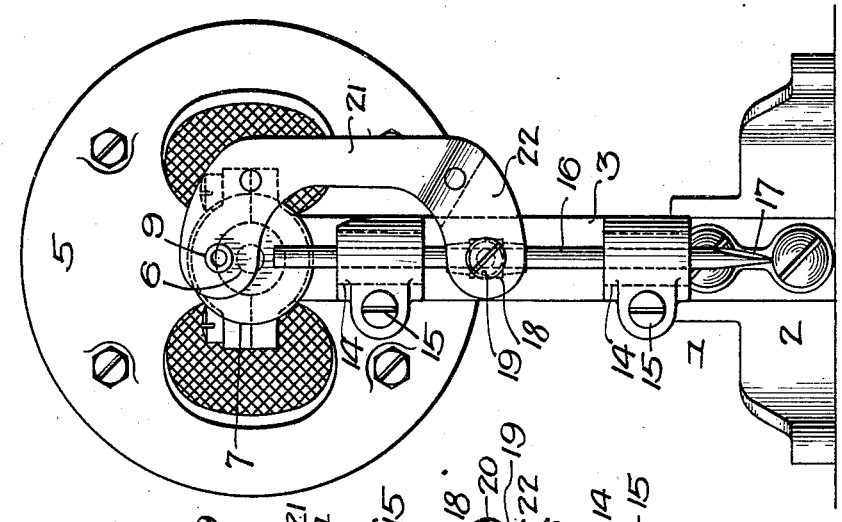
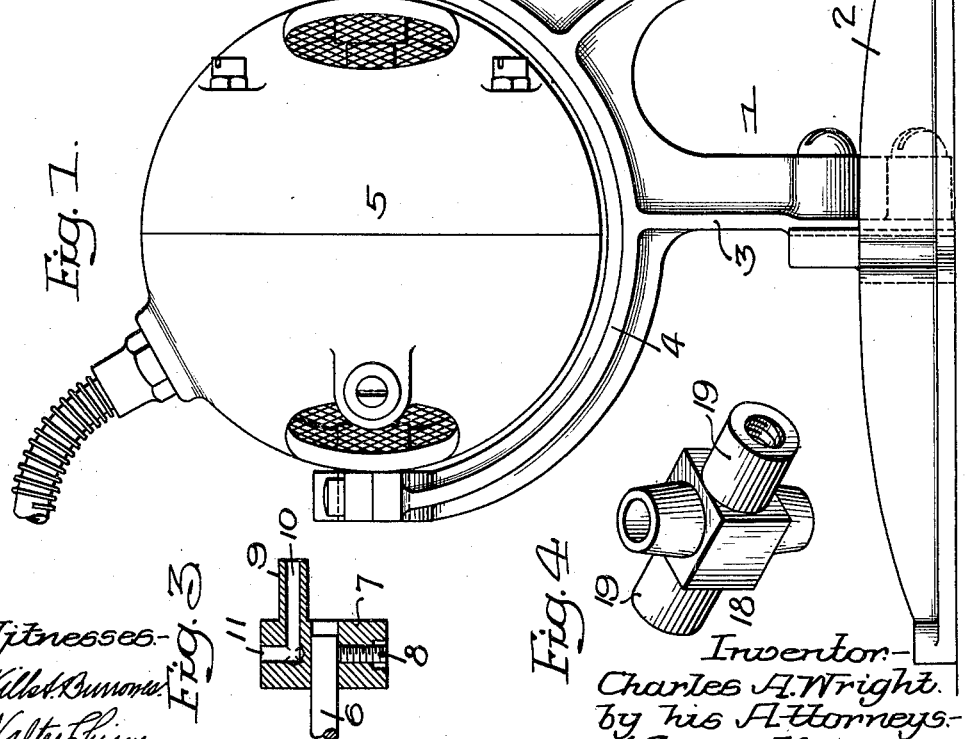
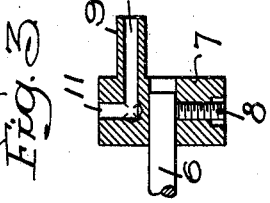
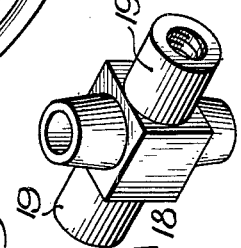
Inventor-
Charles A. Wright.
by his Attorneys-
Howson + Howson
Witnesses-

UNITED STATES PATENT OFFICE.

CHARLES A. WRIGHT, OF PHILADELPHIA, PENNSYLVANIA.

APPLIQUÉ-MACHINE.

1,085,518.      Specification of Letters Patent.      Patented Jan. 27, 1914.

Application filed April 24, 1913. Serial No. 763,330.

*To all whom it may concern:*

Be it known that I, CHARLES A. WRIGHT, a citizen of the United States, residing in Philadelphia, Pennsylvania, have invented certain Improvements in Appliqué-Machines, of which the following is a specification.

One object of my invention is to provide an appliqué machine with a novel form of connection between its driving shaft and the needle, the construction being not only simple and substantial but of such a nature as to prevent the peculiar excessive wear to which machines of this class have hitherto been subjected.

I further desire to provide a connection of the above noted type in which the momentum of the reciprocating parts shall, under operating conditions, be reduced to a minimum with a view of preventing the abnormal wear on the crank pin, the arrangement being such that said pin is automatically cooled, thus making it possible to operate the machine at the high speed desired without danger of injury.

It is also desired that the machine shall have its parts so arranged and constructed as to permit of their being readily renewed or repaired.

These objects and other advantageous ends I secure as hereinafter set forth, reference being had to the accompanying drawings; in which:

Figure 1, is a side elevation of an appliqué machine showing my invention as applied thereto; Fig. 2, is a front elevation of the machine shown in Fig. 1; Fig. 3, is a vertical section of the crank and certain of its associated parts; and Fig. 4, is a perspective view of the cross head.

In the above drawings, 1 represents a suitable supporting frame which consists of a base formed of four relatively heavy feet 2, a central standard 3 and a forked or U-shaped top member 4 having at the upper ends of its side members, capped bearings in which is firmly mounted a substantially spherical electric motor 5. This latter may be of any desired construction and is provided with an armature shaft 6 projecting at one end for the attachment of a crank disk 7. As shown in Fig. 3, said disk is held to the armature shaft by a suitable set screw 8 and is provided with a crank pin 9 in the form of a suitably hardened steel sleeve fixed to or made integral with the crank disk 7. A hole 10 extends longitudinally through this pin and is continued through the crank disk where it is intersected by a hole 11 extending at right angles from the periphery of the said disk.

The frame 1, in addition to the above noted elements, is constructed with a pair of laterally projecting arms 12 and 13 terminating in journals, in each of which is mounted a bushing 14 preferably of oil impregnated wood, although obviously any other suitable form of bearing may be employed without departing from my invention. For retaining said bushings in place, the end of each arm is longitudinally slotted, and screws are provided whereby the slotted faces of each arm may be drawn together for a predetermined limited distance to clamp the bushings in place. The said bushings are in line and serve as a guiding means or bearings for a reciprocable needle bar 16 extending radially of the shaft 6 and provided with an integral needle point 17. I further provide a tubular cross head 18 mounted on the needle bar and having laterally projecting trunnions 19, one of which is internally threaded for the reception of a screw 20 whereby said cross head may be clamped to said needle bar. A connecting rod 21 is forked at one end for the reception of the cross head, whose trunnions are journaled in side members of the fork. At the opposite end the said rod is drilled for the reception of the crank pin 9, it being noted that it has a flattened U-shape so that in side elevation its upper and lower ends have a similar outline, although as above noted, one of them is forked for the reception of the cross head 18 which fits between its branches 22. In order to reduce the momentum of the moving parts of the machine to as low a point as is consistent with strength and efficiency, I make the connecting rod in the shape of a bow of some relatively light resilient material such as wood having the necessary strength and preferably impregnated with oil or some waxy substance.

With the above described arrangement of parts, the operation of the electric motor 5 turns the crank 7 and through the connecting rod 21 causes the needle bar 16 to be reciprocated at a high speed, *i. e.* 3,000 to 4,000 times per minute, in the bearings 14. While with a metallic connecting rod of the ordinary form, the momentum of the moving parts resulting from this rapid reciprocation causes the crank pin to be abnormally worn on the side adjacent the center line of the crank, with the relatively light bowed resilient rod 21 the wear is practically negligible. Moreover, the vibration of the machine as a whole is materially less than when a stiff connecting rod is employed and owing to the use of the oil impregnated wood, the trunnions 19 and the crank pin 9 require no lubrication other than that provided by the parts with which they engage.

The crank pin 9 has hitherto become highly heated during operation owing partly to the friction due to its revolution in the end of the connecting rod and also to the blow struck by said rod each time its direction of movement is changed. By providing the passages 10 and 11, however, I find that the rapid movement of the crank and its pin causes a current of air to be drawn into the latter and discharged through the passage 11 at the periphery of the crank disk 7 owing to the centrifugal force acting on the air in said latter passage. This current carries off the heat which is generated under operating conditions, and thus maintains the crank pin at a safe temperature.

With the relatively heavy base shown and the comparatively light reciprocating parts, not only is the vibration of the machine materially reduced but its durability and life are greatly increased. Should it be desired to remove the connecting rod for inspection or for any other purpose, this may be quickly accomplished by taking out the screw 20 whereupon the needle bar 16 may be drawn out of its bearings through the cross head 18 and the connecting rod moved sidewise off the crank pin 9.

I claim:

The combination in an appliqué machine of a crank; means for driving the same; a reciprocable needle bar; a tubular crosshead having trunnions; a screw mounted in one of the trunnions for clamping said cross-head to the needle bar; with a connecting rod attached at one end to the crank and forked at the other end, said rod having bearings in its two branches for the trunnions of the cross-head.

In testimony whereof, I have signed my name to this specification, in the presence of two subscribing witnesses.

CHARLES A. WRIGHT.

Witnesses:
CHAS. R. RITNER,
CHAS. F. KOLB.

---

Copies of this patent may be obtained for five cents each, by addressing the "Commissioner of Patents, Washington, D. C."